(No Model.)
P. HAUCK.
ADJUSTABLE BOX BLOCK FOR PAPER BOX COVERING MACHINES.
No. 332,078. Patented Dec. 8, 1885.
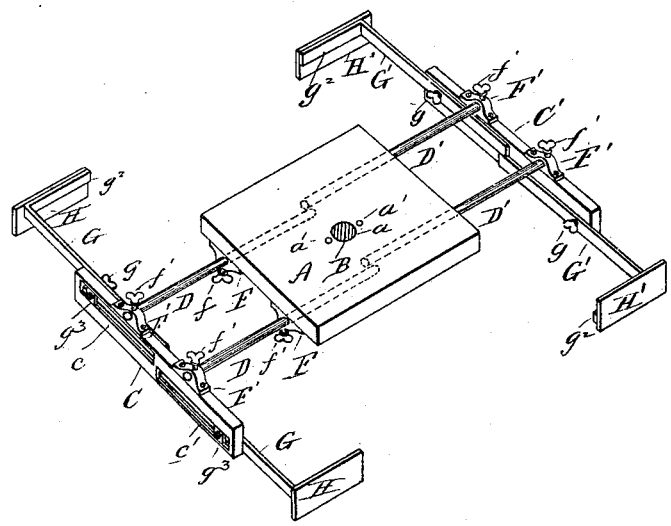
Witnesses:
Will H. Powell.
A. A. Connolly
Inventor:
Philip Hauck,
By Connolly Bros.
Attorneys.

UNITED STATES PATENT OFFICE.

PHILIP HAUCK, OF PHILADELPHIA, PENNSYLVANIA.

ADJUSTABLE BOX-BLOCK FOR PAPER-BOX-COVERING MACHINES.

SPECIFICATION forming part of Letters Patent No. 332,078, dated December 8, 1885.

Application filed November 28, 1883. Serial No. 112,995. (No model.)

*To all whom it may concern:*

Be it known that I, PHILIP HAUCK, a citizen of the United States, residing at Philadelphia, in the county of Philadelphia and State of Pennsylvania, have invented a certain new and useful Adjustable Chuck or Box-Block for Paper-Box-Covering Machines; and I do hereby declare the following to be a full, clear, and exact description of the invention, reference being had to the accompanying drawings, which form part of this specification, in which the figure is a perspective of my invention.

My invention has for its object to provide an improved adjustable chuck or box-block for paper-box-covering machines.

My invention proposes to supply an adjustable chuck which can be increased and diminished at will in size and altered in the extent of the projection of its different ends and sides, so as to adapt it to fit boxes of different sizes and shapes.

My invention consists of an adjustable chuck for paper-box-covering machines, constructed and adapted for use substantially as hereinafter fully described, and particularly pointed out in the claims.

Referring to the accompanying drawing, A indicates the stock or center-piece of my adjustable chuck. Said stock may be square, oblong, or circular, or of any irregular or polygonal outline. It has a central opening, $a$, for the passage of a shaft, B, on which it is to be placed when used, and also two small openings or sockets, $a'\ a'$, for the reception of pins on a face-plate attached to such shaft, so that when the latter is rotated the chuck will turn with it. To the stock A are attached two extensible ends, C C', each of which consists of a straight bar, as shown.

D D' are rods whereby the ends or bars C C' are secured to the stock A, said rods passing into openings in boxes or clips F F' on said stock and bars, respectively, and being adjustably held therein by means of set-screws $f\ f'$. The rods D D are parallel but not in alignment with the rods D' D', so that the rods which support the bar C may pass or rest beside those which support the bar C' without interfering with one another. By loosening the screws $f\ f$, the end bars, C C', either or both, may be extended to any desired distance from the stock A. So, too, shorter or longer rods may be substituted for the rods D D' at any time when the same may be desirable or expedient. The bars C C' each have longitudinal slots $c\ c'$, located in parallel planes, which receive bolts $g\ g$, projecting from or passing through L-shaped bars G G', whereby said bars G G' are carried on said bars C C'. To the arms or bends $g^2\ g^2$ of the bars G G' are secured blocks or sides H H', which constitute two sides of the chuck, and which may be extended to any required distance by loosening the bolts $g$ in nuts $g^3$, and sliding the latter along in the slots $c\ c'$ in the end bars, C C'.

The use and operation of the device are simple and obvious. The chuck is first fitted to the box or size of box with which it is to be used by moving in or out the bars C C' and G G', or any or more of said bars. The chuck is then fitted on the shaft B, the box to be covered placed on it, and the operation of covering it with paper proceeded with in the manner heretofore practiced.

It may be noted that as the bars G G' are carried on the bars C C', the blocks H H' always occupy the corners of the box fitted on the chuck. This would not be the case if said bars G G' were attached directly to the stock A, as in the latter event they would be extensible in only one direction; but with the construction shown and described, said blocks are movable in two directions—i. e., along with the bars C C' and also laterally upon the latter.

The chuck herein described is adjustable to fit boxes of varying shapes. For illustration, a box wider at one end than at the other may have the chuck fitted to it by bringing the blocks on bar C a less distance apart from each other than the blocks on bar C' are from one another.

What I claim as my invention is as follows:

1. An adjustable chuck for paper-box-covering machines, comprising a stock or center with extensible bars or ends connected to said stock and carrying adjustable bars or sides, substantially as shown and set forth.

2. An adjustable chuck for paper-box-covering machines, having bars which are adjustable toward and from the stock or center, and which carry other bars adjustable on their supports, substantially as shown and described.

3. The combination, with stock or center A, of bars C C', secured to said stock by adjustable rods D D', and L-shaped bars G G', said bars C C' being longitudinally slotted, and the bars G G' being secured on said bars C C' by bolts $g\ g$, fitting in slots, substantially as shown and set forth.

4. In a chuck or box-block for paper-box-covering machines, the combination, with a center or stock, A, having extensible bars forming sides or ends, of adjustable rods for connecting said stock and bars, said rods being arranged parallel with each other, so as to permit those on one side of said stock to pass or rest beside those on the other side, substantially as shown and set forth.

In testimony that I claim the foregoing I have hereunto set my hand this 22d day of November, 1883.

PHILIP HAUCK.

Witnesses:
ANDREW ZANE, Jr.,
M. D. CONNOLLY.